United States Patent
Quick

[19]
[11] Patent Number: 5,462,327
[45] Date of Patent: Oct. 31, 1995

[54] REMOVABLE STEAM TABLE PAN PULLER

[76] Inventor: Randall A. Quick, 8526 State Rte. 4, Staunton, Ill. 62008

[21] Appl. No.: 283,814

[22] Filed: Aug. 1, 1994

[51] Int. Cl.[6] .................................................. A47J 45/10
[52] U.S. Cl. .................................... 294/27.1; 294/33
[58] Field of Search .................. 294/15, 16, 27.1–31.1, 294/32–34, 165–167, 170; 16/110 A, 114 R, 114 A; 220/752, 759, 760, 768, 769, 773

[56] References Cited

U.S. PATENT DOCUMENTS

| | | | |
|---|---|---|---|
| D. 247,916 | 5/1978 | Kesling | D24/16 |
| D. 254,170 | 2/1980 | Croyle et al. | D7/132 |
| 850,983 | 4/1907 | Valiquette | 294/32 |
| 1,431,792 | 10/1922 | Hassler | 294/33 X |
| 2,951,615 | 9/1960 | Crane | 220/759 X |
| 3,023,043 | 2/1962 | Ragains | 294/31.1 |
| 3,112,948 | 12/1963 | Burns | 294/27.1 |
| 3,262,728 | 7/1966 | Atterbury | 294/33 X |
| 3,333,882 | 8/1967 | Silverman | 294/33 |
| 3,362,743 | 1/1968 | Purpura | 294/33 X |

FOREIGN PATENT DOCUMENTS

| | | | |
|---|---|---|---|
| 29434 | 10/1931 | Australia | 294/32 |
| 1181140 | 6/1959 | France | 294/32 |
| 1294213 | 10/1972 | United Kingdom | 294/33 |

*Primary Examiner*—Johnny D. Cherry
*Attorney, Agent, or Firm*—Don W. Weber

[57] ABSTRACT

A removable steam table pan puller is presented for use in removing pans from a steam table. The pan puller has an inverted U-shaped handle. The bottom of each leg of the handle has a flange attached. These horizontal flanges are perpendicular to the vertical handle and are approximately the same width as the width of the upper lip of a steam table pan. The flanges are approximately 6 to 8 inches long so that they provide a stable base for carrying the pan once it is removed. The flanges also taper downwardly on each end to enable the user of the pan puller to easily slip the puller flanges underneath the lip of a pan on a steam table. The removable handles come in varying sizes depending upon the size of the pans on the steam table. The pan puller may be used to either pull pans from the steam table or to transport pans from the kitchen to the steam table.

6 Claims, 2 Drawing Sheets

REMOVABLE STEAM TABLE PAN PULLER

BACKGROUND OF THE INVENTION

This invention relates to the food industry. More particularly it relates to a pan puller for a steam table pan.

In the food industry, it is common to use a steam table to warm food during the service process. These steam tables are commonly used, for example, in a restaurant that has a food bar or smorgasbord-type of service. Steam tables are also used widely in the catering industry.

The steam table comprises an upper steam tray surface which has a series of essentially rectangular cut-outs in the top. Steam pans (which have a wide flange around the upper edges) are inserted into the cut-outs of the steam table top. Food is placed in the steam pan. Underneath the steam table is a system of heat, commonly steam heat, which is used to heat the food in the pans. Heating the lower portion of the steam pans keeps the food warm.

When food is being served, it will often be necessary to replace the food consumed with additional prepared food from the kitchen. In order to do this, it is common practice to replace the entire pan. However, access to the steam pan edge, or flange, is frequently difficult to achieve. Oftentimes forks, knives or spoons are used to raise the lip of the steam pan from the steam table in order to lift the pan. Furthermore, once the pan is lifted, it is normally carried by the use of towels, hotpads or the like to protect the carrier's hand since the steam pans are hot. The use of eating utensils to raise the pans, as well as the use of towels or hotpads to carry the steam tray, is not conducive to an efficient method of serving food from a steam table.

It is an object of this invention to provide a removable pan puller which is capable of pulling the steam pan from the steam table without the necessity of using separate implements. It is a further object of this invention to provide a stable means of attaching a pan puller to a steam pan in order to carry the pan.

It is a still further object of this invention to provide a unique handle for placing a steam pan on a steam table and for removing the pan once it is empty. It is also an object of this unique invention to provide a removable steam table pan puller which enables the user to quickly and efficiently remove and carry steam pans. Other and further objects of this invention will become apparent upon reading the below described Specification.

BRIEF DESCRIPTION OF THE INVENTION

This invention comprises essentially left and right long, narrow flanges attached to an upper inverted U-shaped handle. The flanges are tapered at both ends so that they may be easily placed underneath a steam pan when it is located on a steam table. The flanges' width approximate the width of the lip around the top of the steam pan.

In order to remove a steam pan from a steam table using this device, the front tapered edges of the flanges are slipped underneath the lip of the steam pan. The device is then positioned so that the flanges are in the approximate center of the steam pan. The pan may then be readily lifted by means of the handle and transported to the kitchen. In the reverse application, the removable handle is easily positioned with the flanges underneath the upper lip of the steam pan when the steam pan is located on a table. The pan may then be carried to the steam table and placed in the appropriate cut-out. The handle is easily removed after the food is positioned properly and easily in the steam table.

BRIEF DESCRIPTION OF THE DRAWING FIGURES

DETAILED DESCRIPTION OF THE PREFERRED EMBODIMENT

A removable steam table pan puller is presented for use in transporting and removing a pan from a steam table. A perspective view of the device is shown in FIG. 1.

Figure 1:
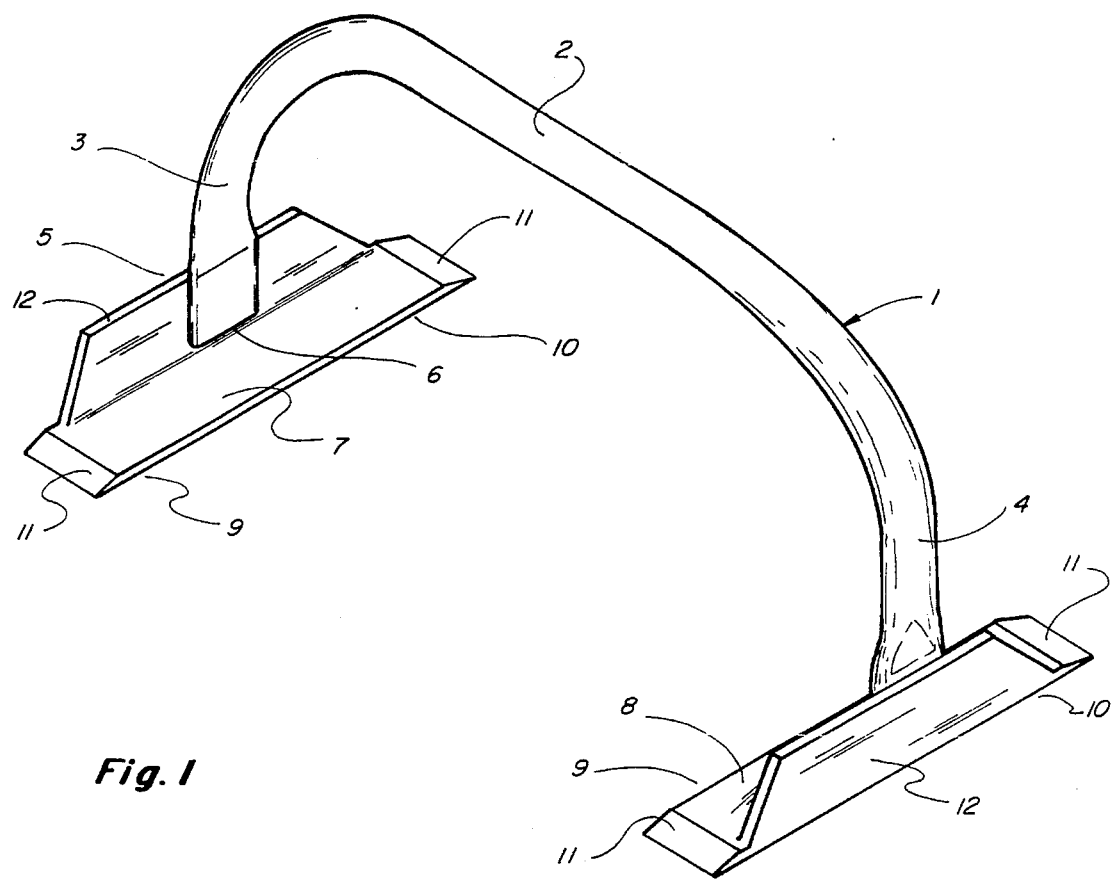
FIG. 1 is a perspective view of the steam table pan puller.

The steam table pan puller, as shown in FIG. 1, has a vertical handle 1. This vertical handle 1 has an essentially inverted U-shaped configuration comprising an upper gripping portion 2 and opposite left 3 and right 4 lower legs. (Although the embodiment shown in FIG. 1 has rounded corners comprising the U-shape, this particular geometric configuration is meant as a means of illustration only and not as a limitation.) Obviously, the configuration of the handle may take different shapes while still keeping within the spirit and disclosure of this invention.

Left 3 and right 4 legs have a lower flange portion 5. Attached to the bottom 6 of each lower leg are left 7 and right 8 horizontal flanges. These horizontal flanges are perpendicular to the vertical handle 1 (FIG. 3) and attached near the bottom 6 of respective left 3 and right 4 lower legs.

As best shown on FIG. 1, both the front 9 and rear 10 of each flange have a taper 11. This taper 11 tapers downwardly to enable the horizontal flanges 7 and 8 to slip underneath the upper lip 17 of the steam pan. (See FIGS. 2 and 5.)

In the preferred embodiment of the device, a flange bracket 12 is attached to each left and right horizontal flange in order to provide a stronger support for the flange as it is attached to the upper handle. These flange brackets 12 may be of varying geometric shape, the trapezoidal shape illustrated herein being meant as a means of illustration only and not as a limitation.

Since steam tables may frequently have steam pans having varying widths, the removable steam table pan puller illustrated herein may be manufactured in varying overall widths to complement the varying widths of the steam pans to be carried. For example, a standard width steam pan would be approximately 13¼ inches from edge to edge. Consequently, the distance between the outer edges 19 of the pan puller flanges 7 and 9 should be approximately 13¼ inches to 14 inches. (Since the steam pan has an outer lip approximately one-half inch wide, the tolerances for the width of the pan puller flanges is considerable.)

Figure 4:
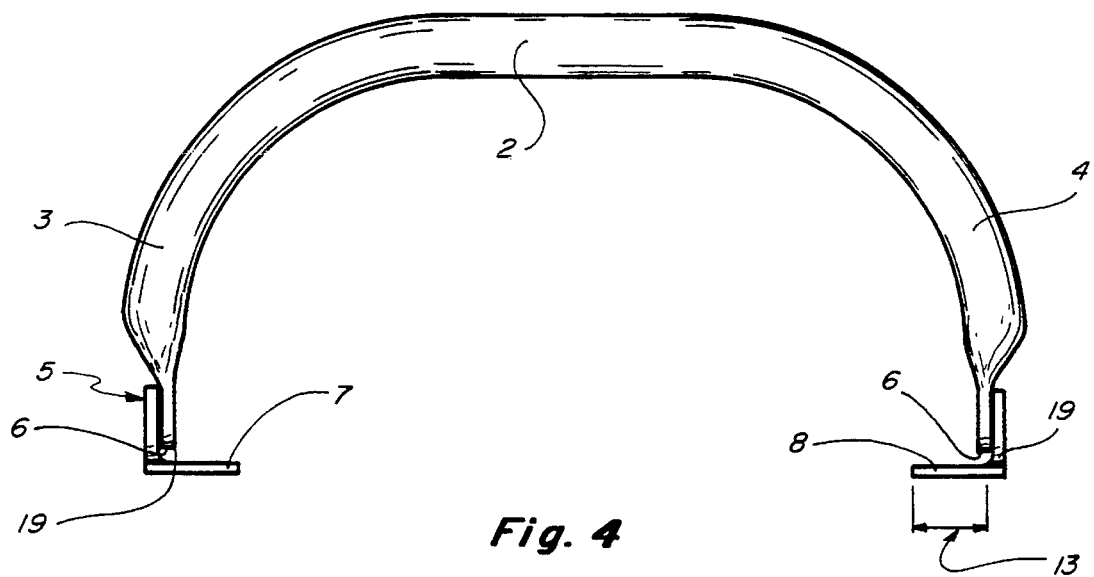
FIG. 4 is a front view of the pan puller.

The width 13 (FIG. 4) of each flange of the pan puller would be approximately one-half inch depending on the width of the lip of the pan to be pulled and carried. The length 14 of the pan puller flanges (as best shown on FIG. 2) would be such that the pan is stabilized when the pan puller is positioned in the approximate center of the pan to be transported. In a preferred embodiment of this invention, the length 14 of each flange is approximately eight (8) inches.

In order to facilitate the easy removal of a pan from a steam table, the height 15 (FIG. 3) of the handle in the embodiment illustrated would be approximately six (6) inches.

It is to be understood that the previously described dimensions are meant as a means of illustration only and not as a limitation. Obviously, precise dimensions are not critical in this device and the dimensions given may vary depending on the size of the pan to be removed, the width of the lip of the pan, the height of any heating lamps or other superstructures located above the pan, and due to the variations of the dimensions of the steam table pans themselves.

Figure 2:
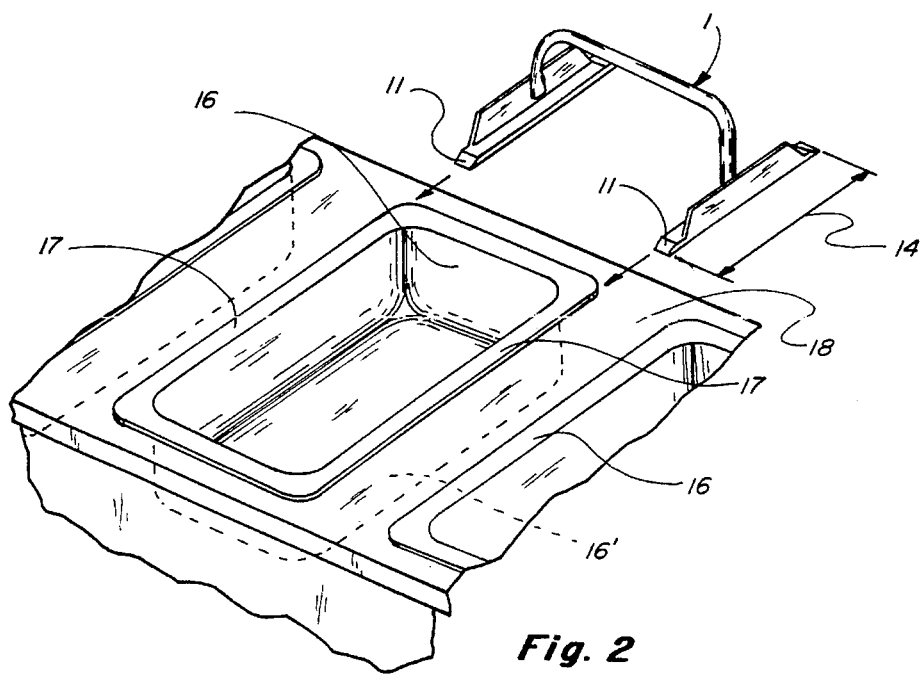
FIG. 2 is a perspective view of the pan puller shown in its intended environment of use.

Turning to FIG. 2, the removable steam table pan puller is shown in its natural environment of use. The puller is designed to be used with a steam table 18 shown in cutaway on FIG. 2. The steam table 18 supports the steam pans 16. The top of the steam table is cut away so that the bottom 6' of the steam pan 16 resides underneath the top surface of the steam table. A wide steam pan flange 17 is positioned about the perimeter of the steam pan 16 and supports the pan in place on the steam table 18.

Figure 5:
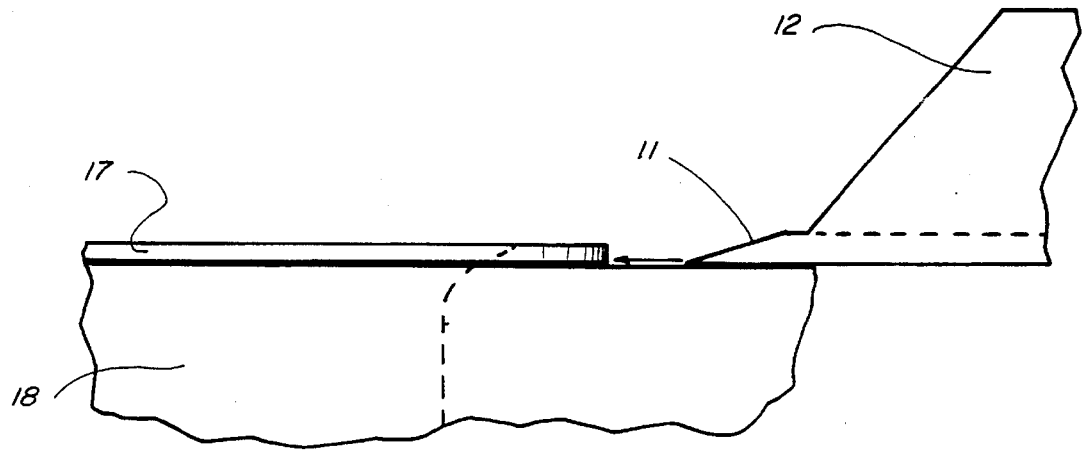
FIG. 5 is a partial side cutaway view of the pan puller shown as it is positioned to slide underneath the steam table pan lip.

As best shown on FIGS. 2 and 5, the steam pan may be removed by sliding the pan puller (as shown by the arrows on FIG. 2). The front and rear tapers 11 of the left 7 and right 8 horizontal flanges enable the flanges to slip under the left and right lips 17 of the steam pan. Once this is accomplished, the entire pan puller is moved underneath the lip 17 of the pan until the vertical handle 1 of the puller is located essentially in the center of the pan 16. The pan may then be readily lifted from the steam table and transported to the kitchen.

Alternatively, a full pan located in the kitchen may easily be lifted and transported to the steam table by means of the removable steam table pan puller. Once the pan has been deposited in the appropriate place on the steam table, the pan puller may be removed from the pan by sliding the puller towards the front of the pan and removing it.

Figure 3:
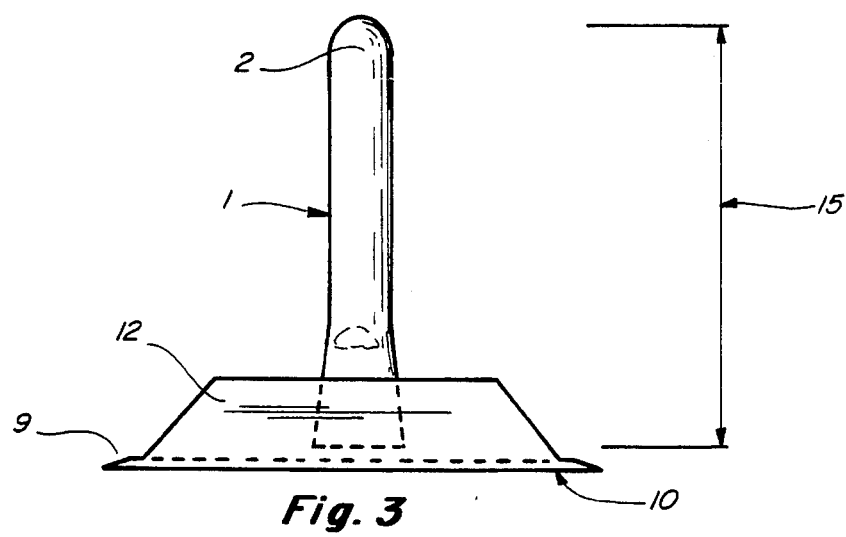
FIG. 3 is a side view of the pan puller.

Both the front 9 and rear 10 edges of the left and right flanges are tapered as best shown on FIGS. 1 and 3. This enables the user to slide the pan puller underneath the lip of the pans from either direction.

The pan puller should be made of a firm material, either steel or aluminum proving satisfactory. The dimensions of the puller may vary depending on the dimensions of the pan to which the puller is applicable.

Having fully described my device, I claim:

1. A removable steam table pan puller, for removing and carrying a steam table pan, said pan having an upper flat outer lip which rests flush to the flat surface of the steam table, comprising:

(a) a vertical, inverted, essentially rigid essentially U-shaped upper handle having a horizontal upper gripping portion and left and right essentially perpendicular vertical lower legs; and (b) left and right essentially rectangular, flat lower, inwardly projecting flanges, attached essentially perpendicularly to the bottom of said left and right lower legs, respectively;

wherein each flange comprises outer and inner long edges, the outer long edge attached to said lower leg, two short front and rear inwardly projecting opposite edges, and an inner edge;

wherein said front and rear opposite edges are tapered downwardly;

whereby the tapered edges of said pan puller flanges may be inserted between the lip of said pan and the surface of said steam table for removing and carrying said pan.

2. A removable steam table pan puller as in claim 1, further comprising right and left flange brackets attached to the lower portion of each lower leg and to the outer edge of said flanges.

3. A removable steam table puller as in claim 1, wherein the height of said pan puller is approximately six inches.

4. A removable steam table pan puller as in claim 3, wherein the length of said flanges is approximately eight (8) inches.

5. A removable steam table pan puller as in claim 4, wherein the width of said flanges is approximately one inch.

6. A removable steam table pan puller as in claim 5, wherein the distance between left and right lower legs is approximately 13¼ inches

* * * * *